United States Patent
Tipton et al.

(10) Patent No.: US 10,547,168 B2
(45) Date of Patent: Jan. 28, 2020

(54) ANTI-THEFT ENCLOSURE AND COVER

(71) Applicant: Hubbell Incorporated, Shelton, CT (US)

(72) Inventors: Wiley Rick Tipton, Friendsville, TN (US); John Thomas Polk, Townsend, TN (US); Greg Glenn Isaacson, Fallbrook, CA (US); Michael Edward Fisher, Knoxville, TN (US); Paul Steven Tramm, Knoxville, TN (US)

(73) Assignee: Hubbell Incorporated, Shelton, CT (US)

( * ) Notice: Subject to any disclaimer, the term of this patent is extended or adjusted under 35 U.S.C. 154(b) by 476 days.

(21) Appl. No.: 14/645,676

(22) Filed: Mar. 12, 2015

(65) Prior Publication Data

US 2015/0263502 A1  Sep. 17, 2015

Related U.S. Application Data

(60) Provisional application No. 62/044,800, filed on Sep. 2, 2014, provisional application No. 61/952,558, filed on Mar. 13, 2014.

(51) Int. Cl.
*H02G 9/10* (2006.01)
*E05G 1/00* (2006.01)

(52) U.S. Cl.
CPC .............. *H02G 9/10* (2013.01); *E05G 1/00* (2013.01); *H02G 2200/10* (2013.01)

(58) Field of Classification Search
CPC ......... H02G 9/10; H02G 2200/10; E05G 1/00
USPC .................................. 220/484, 3.9, 3.2, 3.8
See application file for complete search history.

(56) References Cited

U.S. PATENT DOCUMENTS

| | | | |
|---|---|---|---|
| 3,476,867 A * | 11/1969 | Mack | H02G 9/10 174/37 |
| 3,508,363 A | 4/1970 | Crivello et al. | |
| 4,365,108 A | 12/1982 | Bright | |
| 5,197,307 A | 3/1993 | Abbott, Jr. | |
| 6,527,302 B1 * | 3/2003 | Gault | F16L 41/03 174/50 |
| 7,030,315 B1 | 4/2006 | Dunn et al. | |
| 7,347,070 B1 | 3/2008 | Spector | |
| 7,381,888 B2 | 6/2008 | Burke et al. | |
| 7,683,256 B1 | 3/2010 | Chumacero | |
| 7,807,923 B2 | 10/2010 | Moran | |
| 7,884,283 B1 | 2/2011 | Ousley | |
| 7,922,033 B2 | 4/2011 | Kearby et al. | |

(Continued)

FOREIGN PATENT DOCUMENTS

| | | |
|---|---|---|
| DE | 102007031843 | 1/2009 |
| FR | 2453241 | 10/1980 |

OTHER PUBLICATIONS

PCT/US2015/20219 International Search Report and Written Opinion dated Jun. 24, 2015.

*Primary Examiner* — Andrew T Kirsch
*Assistant Examiner* — Don M Anderson
(74) *Attorney, Agent, or Firm* — Michael Best & Friedrich, LLP

(57) ABSTRACT

A utility enclosure includes a box, a bracket connected to the box, and a lid placed over the box. The box includes a plurality of walls and a central opening. The bracket has a center portion and a first opening in the center portion for receiving a fastener to connect the bracket to one of the walls. The removable lid covers the central opening.

15 Claims, 17 Drawing Sheets

(56) References Cited

U.S. PATENT DOCUMENTS

| | | | |
|---|---|---|---|
| 7,975,515 | B2 | 7/2011 | Ygnelzi et al. |
| 8,302,796 | B1 * | 11/2012 | Johnson ............ H02G 9/10 |
| | | | 174/66 |
| 8,347,670 | B2 | 1/2013 | Rix |
| 8,748,742 | B1 * | 6/2014 | Cordova ............ H02G 1/00 |
| | | | 174/37 |
| 2005/0000175 | A1 | 1/2005 | Machledt et al. |
| 2009/0057316 | A1 | 3/2009 | Schweinberg et al. |
| 2009/0200056 | A1 | 8/2009 | Moran |
| 2009/0249843 | A1 | 10/2009 | Ygnelzi et al. |
| 2011/0290802 | A1 * | 12/2011 | Burros ............ H02G 3/081 |
| | | | 220/327 |
| 2012/0111866 | A1 | 5/2012 | Freeman |
| 2013/0024853 | A1 | 9/2013 | Deng |
| 2014/0000328 | A1 | 1/2014 | Madruga et al. |

* cited by examiner

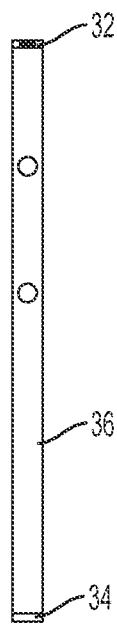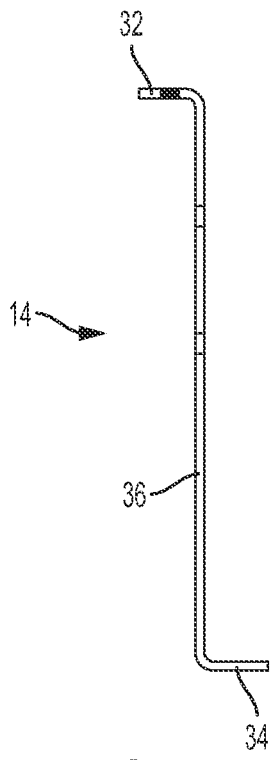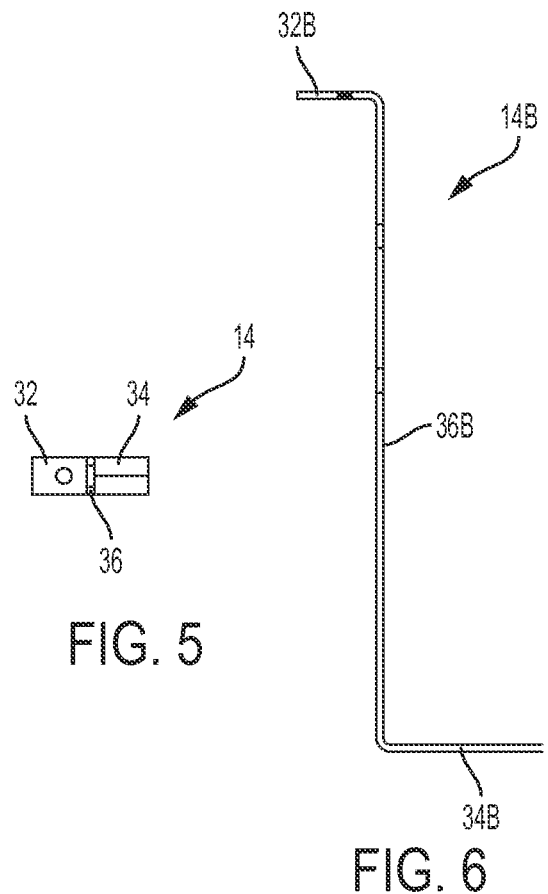
FIG. 3　　FIG. 4　　FIG. 5　　FIG. 6
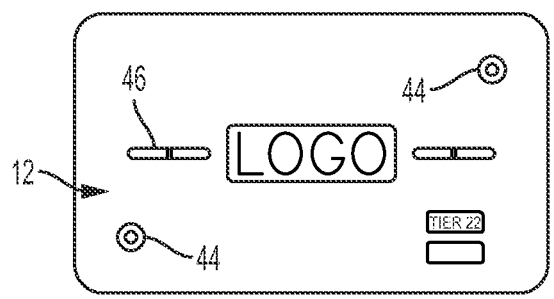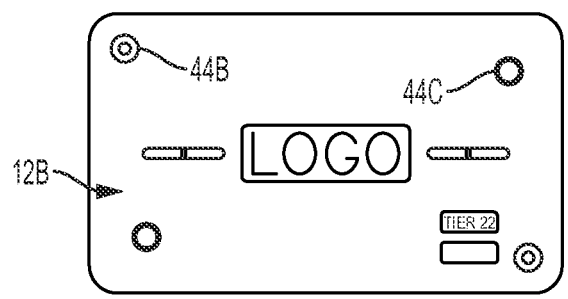
FIG. 7　　FIG. 8

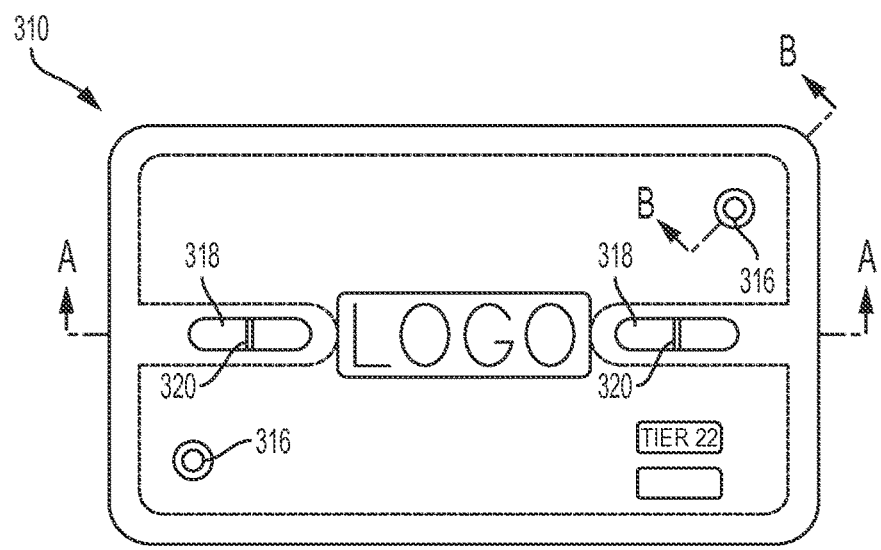
FIG. 16
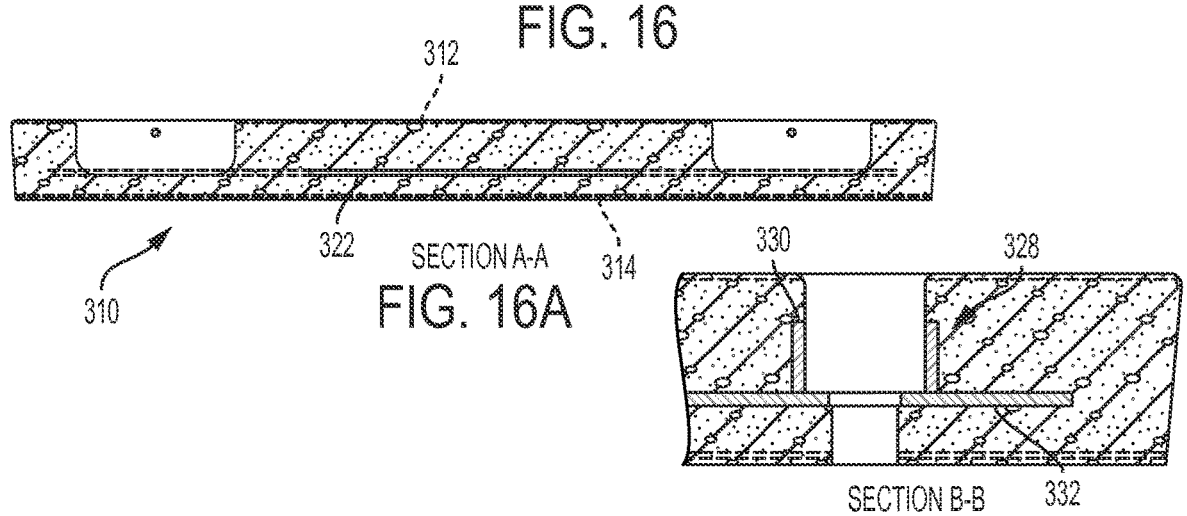
FIG. 16A
FIG. 16B
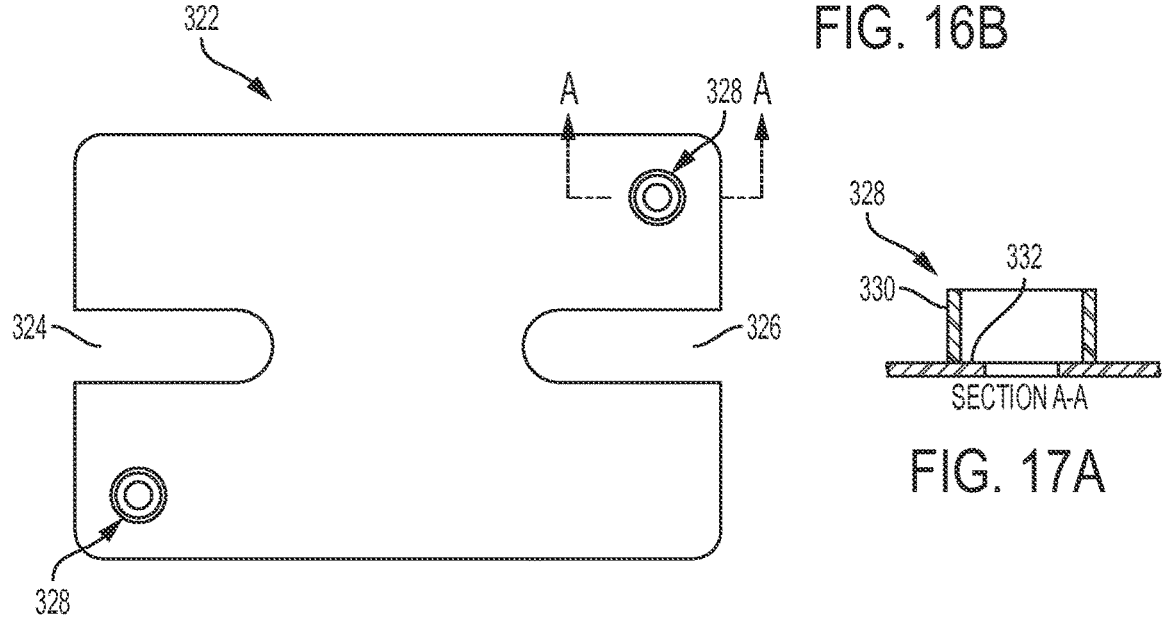
FIG. 17
FIG. 17A

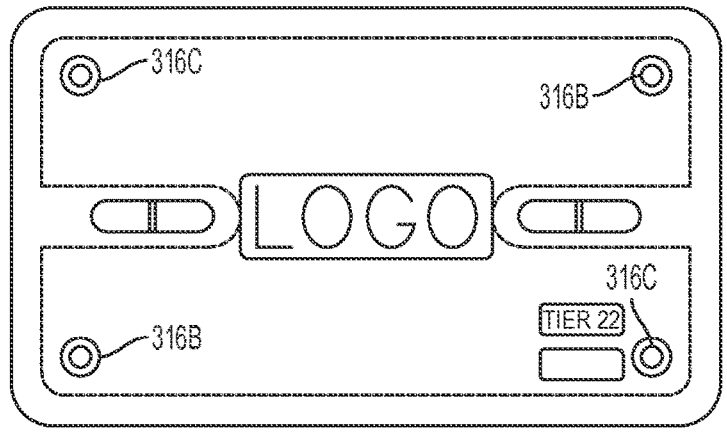
FIG. 18
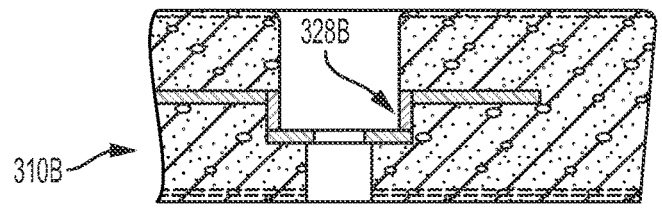
FIG. 18A
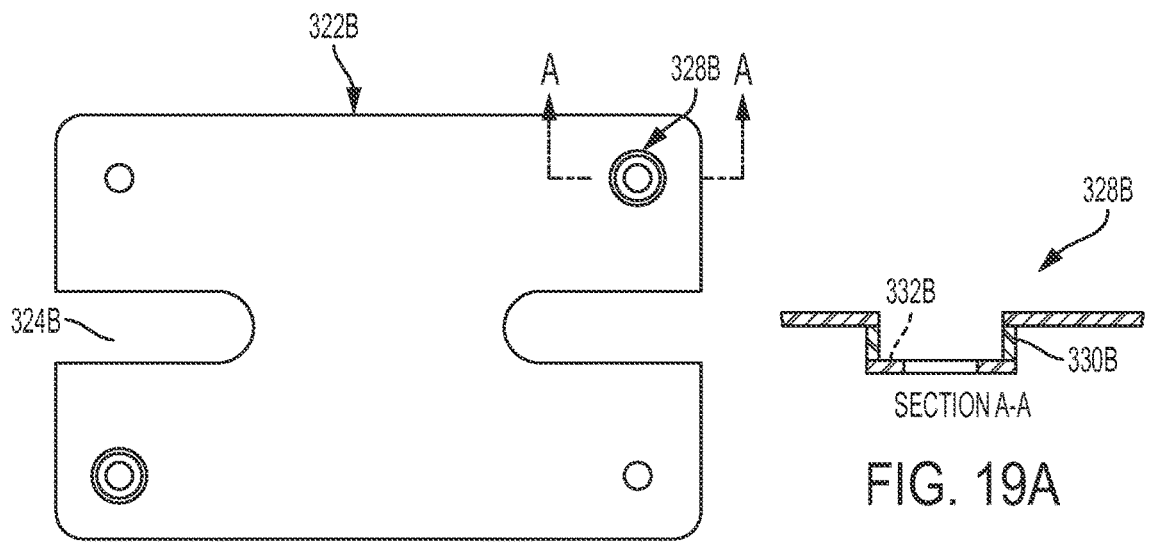
FIG. 19
FIG. 19A

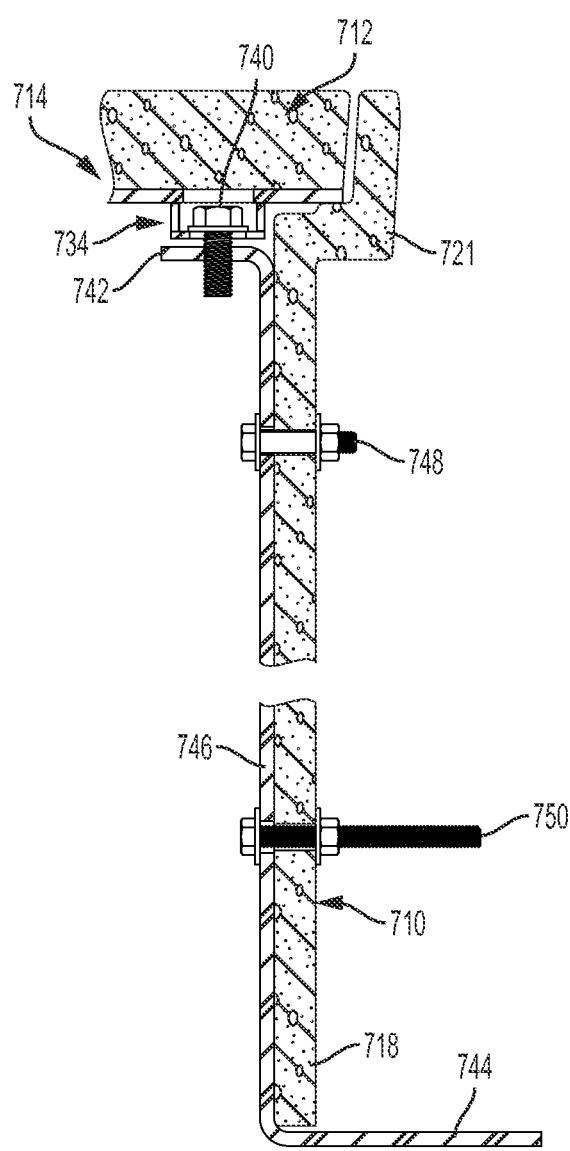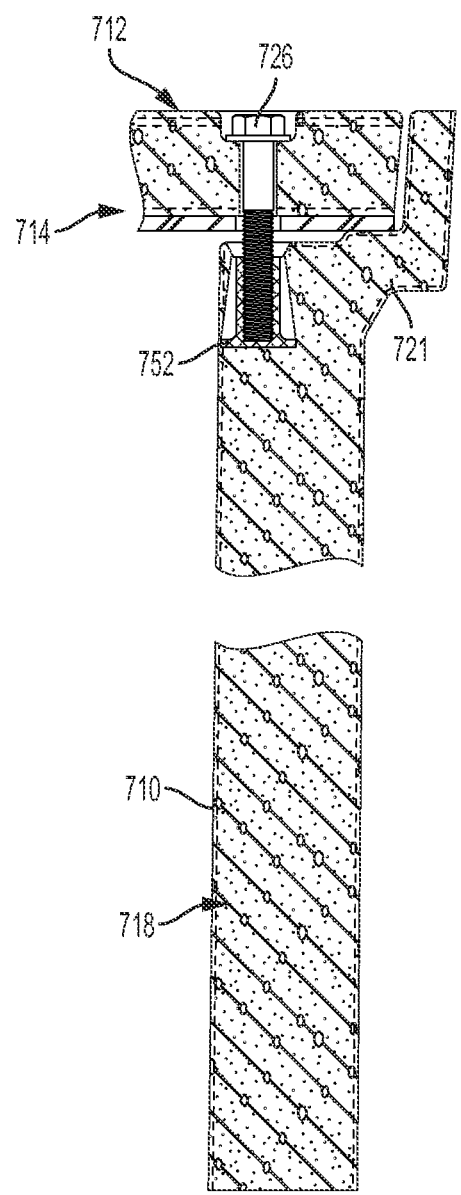
FIG. 30
FIG. 31

US 10,547,168 B2

ANTI-THEFT ENCLOSURE AND COVER

CLAIM TO PRIORITY

This application is based on U.S. Provisional Application Ser. No. 61/952,558, filed on Mar. 13, 2014 and U.S. Provisional Application Ser. No. 62/044,800, filed on Sep. 2, 2014, the disclosure of which are incorporated herein by reference in their entirety and to which priority is claimed.

FIELD

The invention relates generally to the field of utility enclosures, and more particularly to anti-theft devices for in-ground utility boxes.

BACKGROUND

Utility enclosures are located throughout residential and commercial areas to provide housing and access to utility lines, such as electrical, cable, phone, or water lines. Areas around connection points, taps, splices, or other utility junctions are typically provided with an enclosure. Enclosures can be positioned above ground, buried underground, or any combination thereof. The space inside the enclosure can protect the utility line and allow access and room for service or maintenance at the enclosures location.

Enclosures are provided with removable covers, panels or other forms of openings to provide access to the interior. Theft, vandalism, and tampering are common problems with utility lines and enclosures. In certain instances, therefore, it is desirable to prevent or deter unwanted access to the interior of such enclosures.

SUMMARY

According to an exemplary embodiment, a utility enclosure includes a box, a bracket, and a removable lid. The box includes a plurality of walls and a central opening. The bracket has a center portion and a first opening in the center portion for receiving a fastener to connect the bracket to one of the walls. The removable lid covers the central opening.

According to another exemplary embodiment, a utility enclosure includes a box, a first bracket, a second bracket, a removable cover, and a removable lid. The box includes a plurality of walls and a central opening. The first bracket has a first opening for receiving a fastener to connect the first bracket to one of the walls. The second bracket has a second opening for receiving a fastener to connect the second bracket to one of the walls. The removable cover is positioned over the central opening and the removable lid positioned over the cover.

According to another exemplary embodiment, a utility enclosure includes a box, a bracket, a cover, a lid, a first fastener, and a second fastener. The box includes a wall, a rim extending from the wall, and a first aperture. The bracket is connected to the wall and includes a top leg having a second aperture. The cover has a first cover opening and a second cover opening. The lid has a first lid opening. The first fastener passes through the first lid opening, the second cover opening, and is connected to the first aperture. The second fastener passes through the first cover opening and connects to the second aperture.

According to another exemplary embodiment, a utility enclosure includes a box, an insert, a removable cover, and a removable lid. The box includes a plurality of walls and a central opening. The insert is positioned in the central opening and includes a plurality of connected sidewalls. The removable cover is connected to the insert. The removable lid is connected to the box.

According to another exemplary embodiment, a bracket for a utility enclosure includes a center portion, a top leg, and a bottom leg. The center portion has a length extending along a wall of a box. The top leg and the bottom leg extend from the center portion. The center portion includes an opening for receiving a fastener.

BRIEF DESCRIPTION OF THE DRAWINGS

The aspects and features of various exemplary embodiments will be more apparent from the description of those exemplary embodiments taken with reference to the accompanying drawings, in which:

FIG. 3 is a front elevation of an exemplary bracket;

FIG. 4 is a side, sectional view of the bracket of FIG. 3;

FIG. 5 is a top view of the bracket of FIG. 3;

FIG. 6 is a side, sectional view of another exemplary bracket;

FIG. 7 is a top view of an exemplary lid;

FIG. 8 is a top view of another exemplary lid;

FIG. 16 is a top view of another exemplary lid having a reinforcement;

FIG. 16A is a side, sectional view of FIG. 16 along line A-A;

FIG. 16B is a side, sectional view of FIG. 16 along line B-B;

FIG. 17 is a top view of the reinforcement of FIG. 16;

FIG. 17A is a side, sectional view of FIG. 17 along line A-A;

FIG. 18 is a top view of another exemplary lid having a reinforcement;

FIG. 18A is a side, sectional view of FIG. 18 along line A-A;

FIG. 19 is a top view of the reinforcement of FIG. 18;

FIG. 19A is a side, sectional view of FIG. 19 along line A-A;

FIG. 30 is a side, sectional view of FIG. 28;

FIG. 31 is another side, sectional view of FIG. 28;

DETAILED DESCRIPTION OF EXEMPLARY EMBODIMENTS

Figure 1:
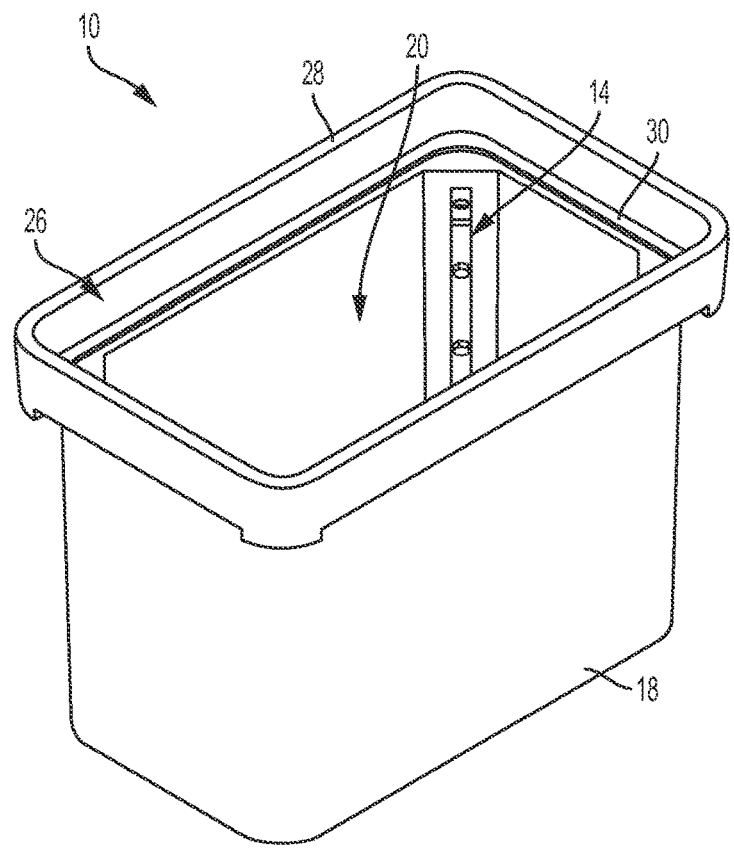
FIG. 1 is a top perspective view of an exemplary box.

Various exemplary embodiments are generally directed to an enclosure designed to prevent theft of underground utility lines, for example copper electrical wires. In an exemplary embodiment illustrated in FIGS. 1 and 2, an enclosure includes a box 10 having a lid 12 and one or more brackets 14. In an exemplary embodiment, the box 10 is made from polymer concrete and mounted in the ground. The box 10 may be made from other suitable materials, for example plastics or other composite materials. The box 10 may be positioned so that the top of the lid 12 is flush with a street or sidewalk and the interior provides access to a utility line. The area around the box 10 may be filled with dirt or concrete to secure the box 10 to the ground.

The box 10 has a plurality of connected walls 18 surrounding a central opening 20 and an open bottom. In certain embodiments, four or more walls 18 may be used, for example eight walls to give the box an octagonal configuration to maximize the available internal space. In various exemplary embodiments, any number or combination of rectilinear or curvilinear sides may be used, including a single circular or oval side. The walls 18 have a bottom edge 22 and a top edge 24. A rim 26 extends from the top edge 24 of the walls 18. The rim 26 includes an upper edge 28 and a lip 30. In certain placements of the box 10, the upper edge 28 lies substantially flush with the ground level. The lip 30 receives the lid 12 and may be spaced between the top edges 24 of the walls 18 and below the upper edge 28 of the rim 26. The lid 12, however, can be configured to rest on the top edge 24, the lip 30, the upper edge 28, or any combination thereof. The walls 18 and rim 30 may be integrally formed from a polymer concrete composite, or other suitable material.

One or more brackets 14 are connected to the box 10. In an exemplary embodiment, two brackets 14 are used at opposite corners of the box 10. As best shown in FIGS. 3-5, the bracket 14 has a top leg 32, a bottom leg 34, and a center portion 36 connecting the top and bottom legs 32, 34. In the exemplary embodiment shown, the top and bottom legs 32, 34 extend from the center portion 36 in opposite directions at a substantially right angle, although any angle may be used. The center portion 36 need not be in the center of the bracket 14 or the main portion of the bracket 14. When the brackets 14 are connected to the box 10, the top leg 32 extends into the central opening 20 and the bottom leg 34 extends underneath a sidewall 18. The center portion 36 extends along a proximate wall 18, with the top leg 32 extending near or at the top edge 24 and the bottom leg 34 extending underneath of and near or in contact with the bottom edge 22. In various exemplary embodiments, different sized and spacing orientations may be used for the bracket 14.

Additionally, the length of the bottom leg 34 may vary. As best shown in FIG. 6, another exemplary bracket 14B has an extended bottom leg 34B. In the first exemplary bracket 14, the top leg 32 and the bottom leg 34 are close in length or substantially the same length. The second exemplary bracket 14B has a bottom leg 34B that is longer than the top leg 32B. In an exemplary embodiment, the bottom leg 34B is at least fifty percent longer than the top leg 32B. In another embodiment the bottom leg 34B is at least twice as long as the top leg 32B. In another embodiment, the bottom leg 34B has a length sufficient to extend underneath and past the wall 18 as shown, for example, in FIG. 2, whereas the bottom leg 32 of the first exemplary bracket 14 would not extend past the wall 18. The longer bottom leg 34B increases the resistance to pull out.

Figure 2:
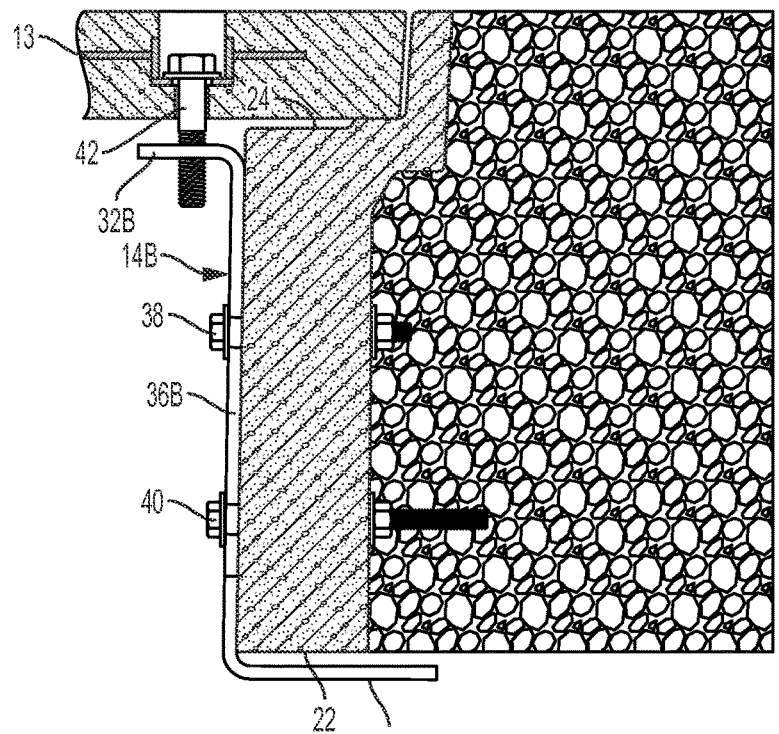
FIG. 2 is a side, sectional view of the box of FIG. 1 positioned in the ground.

In an exemplary embodiment best shown in FIGS. 1 and 2, the bracket 14 center portion 36 includes a pair of holes for receiving a first fastener 38 and a second fastener 40 to connect the bracket 14 to the walls 18. The first and second fasteners 38, 40 are depicted as bolt assemblies, having a bolt with a head, a nut, and one or more washers. Different fasteners or other mechanical connections can also be used as would be understood by one of ordinary skill in the art. The location of the holes may be varied along the length of the center portion 36. The first and second fasteners 38, 40 may also extend through the sidewall 18 and into the adjacent area, for example the ground or a concrete apron. In an exemplary embodiment, the second fastener 40 is longer than the first fastener 38 to provide a more secure connection. In various exemplary embodiments, the length of the fasteners 38, 40 may vary.

FIG. 7 shows an exemplary embodiment of a lid 12 for use with the box 10. The lid 12 connects to the box with one or more fasteners 42. The top leg 32 of the bracket 14 can include a threaded aperture for receiving the fastener 42. The fastener 42 extends through the lid 12 and into the threaded aperture to secure the lid 12 to the box 10. The lid 12 can include one or more openings 44 for receiving the fastener 42. The number of openings 44 may be equal to the number of brackets 14 connected to the box 10. The opening 44 may include a counter bore to allow the head of the fastener 42 to be positioned at or beneath the top surface of the lid 12.

The lid 12 may be made from concrete, polymer, a polymer concrete blend, or other suitable material. The lid 12 may also include a reinforcement 13 to increase the lid strength. The reinforcement 13 can be integrally molded with the lid 12 and can be made from metal, for example a steel plate, a fiberglass reinforced matting, or other suitable strengthening material. Various types of fasteners may be used including, but not limited to, a penta-head bolt or a vandal resistant type bolt. The lid 12 may also include one or more pull tabs 46 to assist in facilitating removal of the lid 12 from the box. A company logo can be printed on the lid 12.

In another exemplary embodiment, a lid 12B has a first set of openings 44B and a second set of openings 44C. The first and second set of openings 44B, 44C may have different through diameters. For example the second set of openings 44C may have a larger through diameter to facilitate easier alignment with the bracket. The openings 44B, 44C can also receive fasteners that connect directly to the box 10 as opposed to the bracket 14.

The features of bolting the bracket 14 to the walls 18, having the bolts extend past the walls into the surrounds, and the bottom leg 34 extending underneath the sidewall 18, either alone or in any combination, assist in preventing the box 10 or the lid 12 from being pulled out by force. This pull-out resistance helps prevent unwanted access to utility lines or other contents of the box 10. In various exemplary embodiments, the brackets 14 described herein may extend only partially along the height of the wall 18 and the bottom leg 34 may be omitted.

Figure 9:
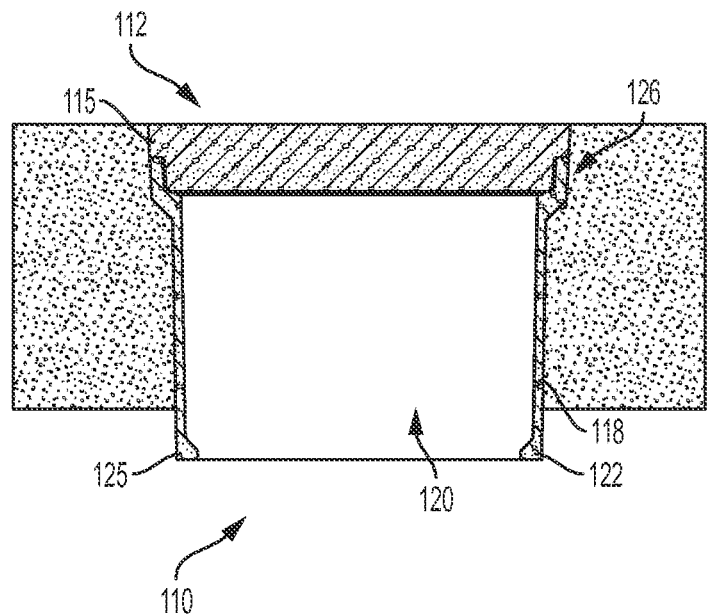
FIG. 9 is a side, sectional view of another exemplary box and lid positioned in the ground.
Figure 10:
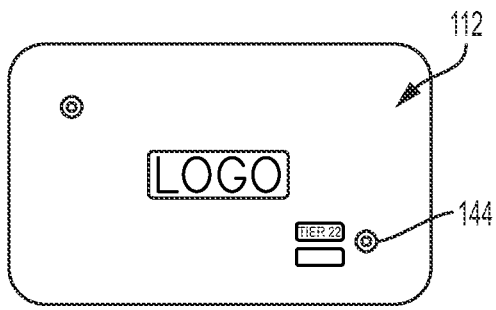
FIG. 10 is a top view of the lid of FIG. 9.
Figure 11:
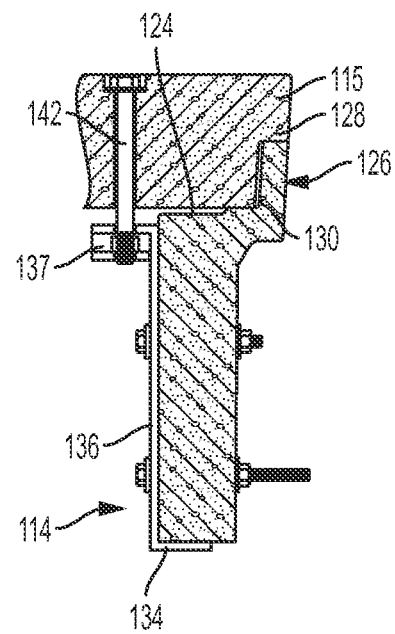
FIG. 11 is a side sectional view of the box and lid of FIG. 9 and another exemplary bracket.

FIGS. 9-11 depict another exemplary embodiment having a box no, a lid 112, and one or more brackets 114. The box no has a plurality of connected walls 118 surrounding a central opening 120. The walls 118 have a bottom edge 122 and a top edge 124. An area 125 of the walls proximate the bottom edge 122 may have an increased thickness and a chamfered edge. A rim 126 extends from the top edge of the walls 118. The rim 126 includes an upper edge 128 and a lip 130. In certain exemplary placements of the box no, the upper edge 128 does not extend to the surface level of the ground. Instead, the lid 112 has an extension 115 that overlaps the upper edge 128 of the rim 126 with the top surface of the lid 112 flush with the ground. The extension 115 can extend all the way around the edge of the cover 112 or partially around the cover 112.

One or more brackets 114 includes a top leg 132, a bottom leg 134, and a center portion 136 are bolted to one or more walls. As best shown in FIG. 11, the top leg 132 has a captive, self-aligning nut assembly 137 for receiving a fastener 142. When utilizing the nut assembly, 137, the threads can be removed from the bracket 114. The fastener 142 passes through an opening 144 in the lid 112 and into the top leg 132 of the bracket 114 which has a cavity, or hollow section containing a nut. The fastener 142 aligns with the nut to secure the lid 112 to the box 110.

Figure 12:
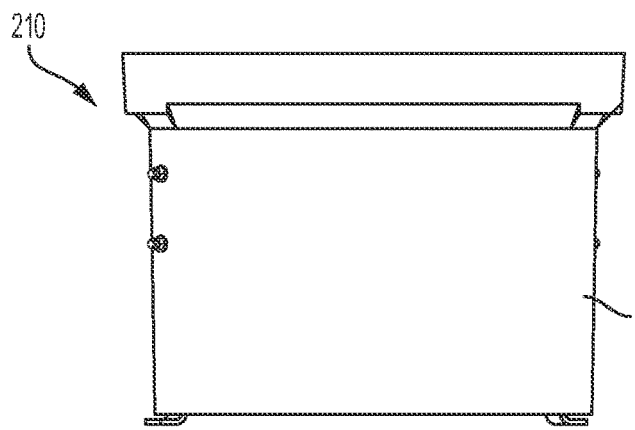
FIG. 12 is a side elevation of another exemplary box.
Figure 13:
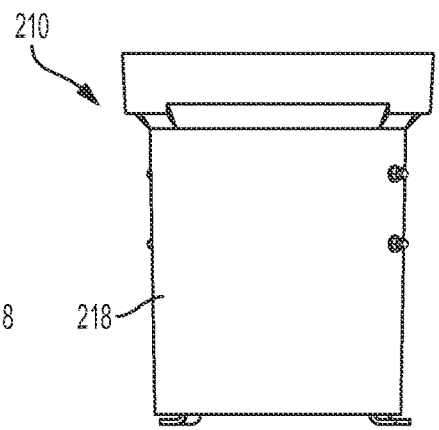
FIG. 13 is a front elevation of the box of FIG. 12.
Figure 15:
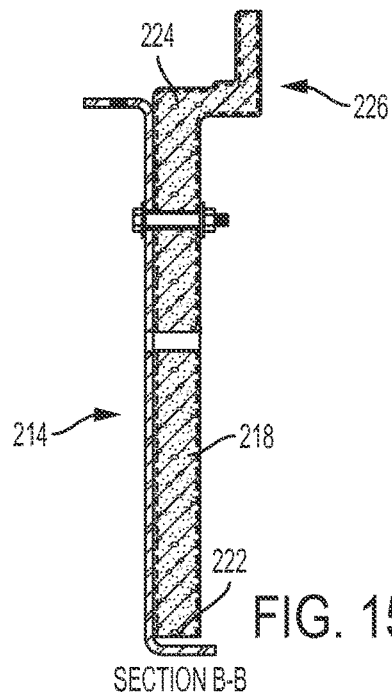
FIG. 15 is a side, sectional view of FIG. 14 along line B-B.

FIGS. 12 and 13 depict another exemplary box 210 and one or more brackets 214. The box 210 has a plurality of connected walls 218 surrounding a central opening 220 and an open bottom. The walls 218 have a bottom edge 222 and a top edge 224. A rim 226 extends from the top edge 224 of the walls 218. The rim 226 includes a first opening 228 and a second opening 230 for receiving a fastener (not shown). The first and second openings 228, 230 may include a connective member, for example a threaded insert. The first and second openings 228, 230 allow the lid to be bolted directly to the box 210 and bolted to one or more brackets 214. As shown in FIG. 15, one or more brackets 214 are connected to the wall, for example using one or more fasteners extending into the wall 218.

Figure 14:
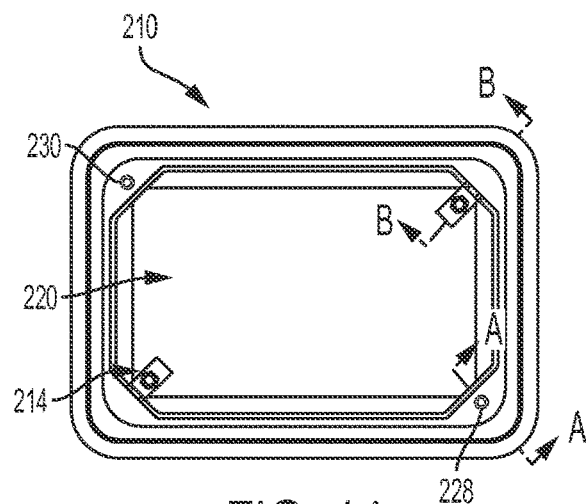
FIG. 14 is a top view of the box of FIG. 12.
Figure 14A:
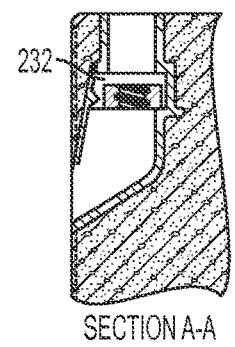
FIG. 14A is a side, sectional view of FIG. 14 along line A-A showing an exemplary insert.
Figure 14B:
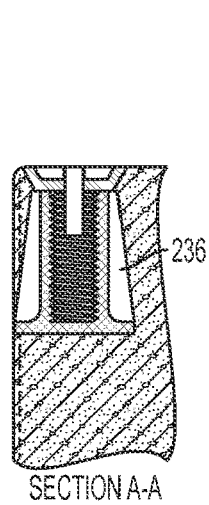
FIG. 14B is a side, section view of FIG. 14 along line A-A showing another exemplary insert.

In one exemplary embodiment depicted in FIG. 14A, the first and second openings 228, 230 include a lag insert 232 for receiving the fastener, for example a lag bolt. The lag insert 232 can be molded into the box 210 below the openings 228, 230. In another exemplary embodiment depicted in FIG. 14B, the first and second openings 228, 230 include a threaded star insert 236 for receiving the fastener. The star insert 236 can be made from metal. Other threaded inserts can be molded into the box 210 to receive a threaded fastener.

FIGS. 16-17A depict an exemplary embodiment of a lid 310 having a reinforcement member 322 that may be used with any of the boxes described herein. The lid 310 may be made from a polymer concrete composite material to allow for strength and moldability. The lid 310 includes one or more fastener openings 316 to receive a fastener to attach the lid 310 to a box. The top surface 312 includes one or more pull slots 318. The pull slots 318 each include a substantially obround depression and a transverse bar 320. The bar 320 may be made from metal that is molded into the lid 310. The reinforcement member 322 can be molded into the lid 310.

In an exemplary embodiment, the reinforcement member 322 includes a plate having a first slot 324 and a second slot 326 to provide an opening for the pull tab depressions. The plate also includes one or more grommets 328 that align with the fastener openings 316. The grommet 328 may have a hollow cylindrical wall 330 extending from a flange 332 surrounding an opening. The opening is coaxial with the cylindrical wall 330 and has a diameter less than the diameter of the cylindrical wall 330 to securely retain a fastener so that the head of the fastener is below the top surface 312 of the lid 310. The reinforcing member 322 may be made from 10 gauge steel or any other suitable metal, polymer, or composite material that adds strength to resist pull out. In another exemplary embodiment, the reinforcement member 322 can include fibers, for example a fiberglass mesh or mat.

FIGS. 18-19A depict another exemplary embodiment of a lid 310B having a reinforcement member 322B. The lid 310B includes a first set of openings 316B and a second set of openings 316C. The first and second set of openings 316B, 316C may have different through diameters. For example the second set of openings 316C may have a larger through diameter to facilitate easier alignment with a bracket. The reinforcing member 322B includes a plate having a first slot 324B and a second slot 326B to provide an opening for the pull tab depressions. The plate also includes a grommet 328B that extends below the reinforcing member 322B. The grommet 328B may have a hollow cylindrical wall 330B extending from a flange 332B surrounding an opening. The opening is coaxial with the cylindrical wall 330B and has a diameter less than the diameter of the cylindrical wall 330B to securely retain a fastener so that the head of the fastener is below the top surface 312B of the lid 310B. The reinforcing member 322B may be made from 10 gauge steel or any other suitable metal, polymer, or composite material that adds strength to resist pull out. In another exemplary embodiment, the reinforcement member 322B can include fibers, for example a fiberglass mesh or mat.

Figure 20:
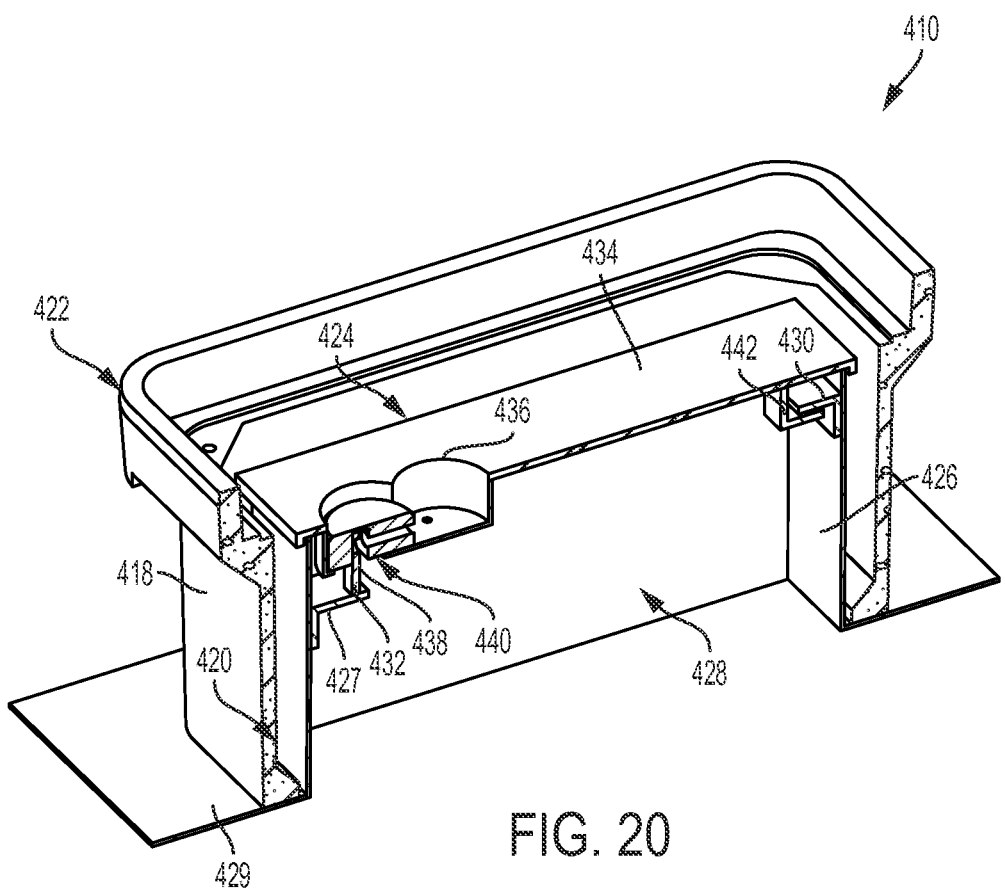
FIG. 20 is a top perspective, sectional view of an exemplary box with an insert and a cover.
Figure 21:
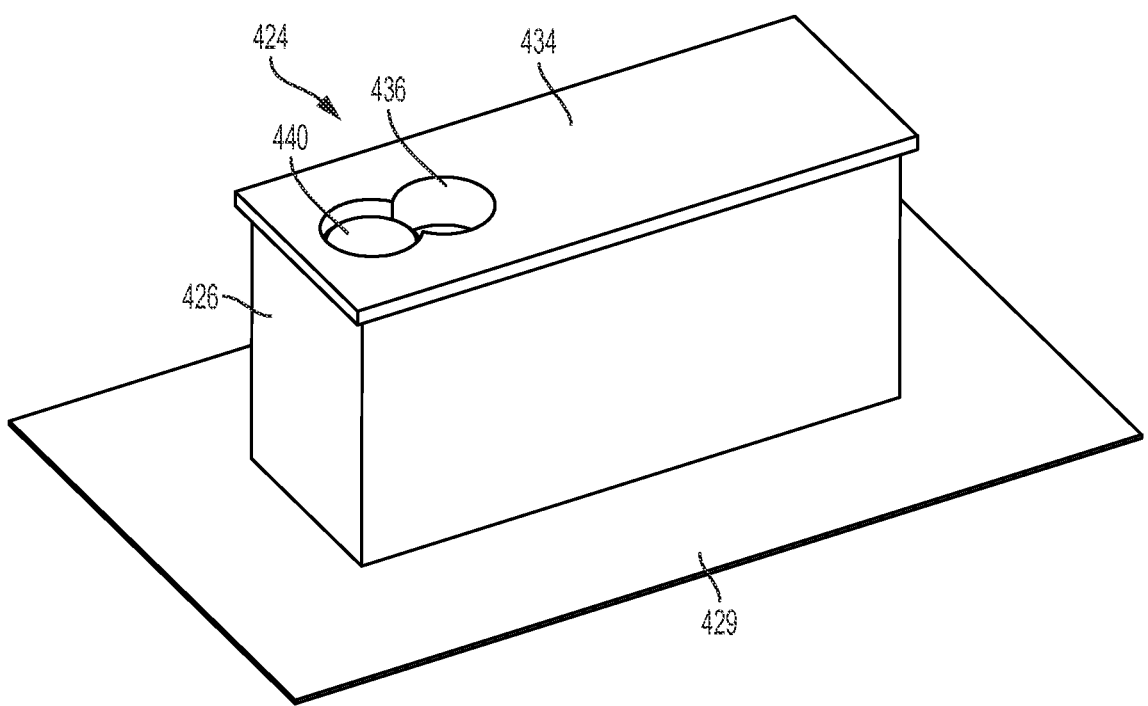
FIG. 21 is a top perspective view of the insert and cover of FIG. 20.

FIGS. 20-21 depict another exemplary embodiment having a box 410 with a plurality of connected walls 418 surrounding a central opening 420. A rim 422 extends from the walls 418. An insert 424 is positioned in the central opening 420. The insert 424 may be made of steel, a polymer, a reinforced polymer, composite, or other suitable material. The insert has a plurality of sidewalls 426 surrounding a central region 428. A flange 429 extends from the sidewalls 426 away from the central region 428 and under the walls 418 of the box 410.

A cover 434 is connected to the top of the insert 424. The cover 434 and the insert 424 are connected through a locking interface at a first end and a joint interface at a second end of the insert 424. In an exemplary embodiment, the locking interface includes a first projection 427 and a leg 432 extending upward from the first projection 427. The leg 432 includes an opening to receive the shackle of a lock. The cover 434 includes a top surface and a bottom surface. An opening 436 is provided in the top surface and a slot 438 is provided in the bottom surface. The slot 438 receives the leg 432 extending from the first projection 427. The opening 436 receives a disc-shaped lock 440 that secures the cover 434 to the insert 424. In an exemplary embodiment, the joint interface includes a second projection 430 extending from the sidewall 426 and a third projection 442 extending from the bottom surface of the cover 434. The third projection 442 may slide into place to mate with the second projection 430 as the cover 434 is placed onto the insert 424. The third projection 442 is substantially L-shaped, although other configurations may also be used. After the cover 434 is secured to the insert 424, a lid (not shown) may be placed over the cover 434 onto the box 410.

Figure 22:
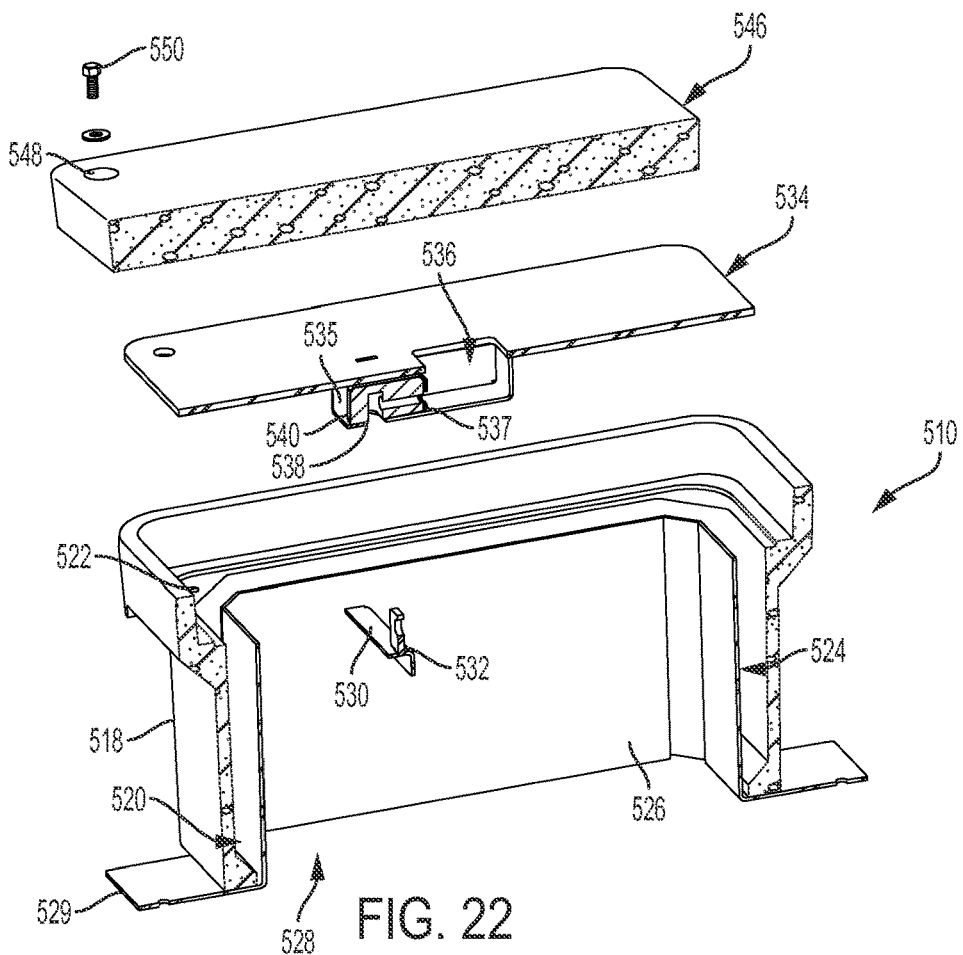
FIG. 22 is a top perspective, sectional view of another exemplary box with an insert and a cover.
Figure 23:
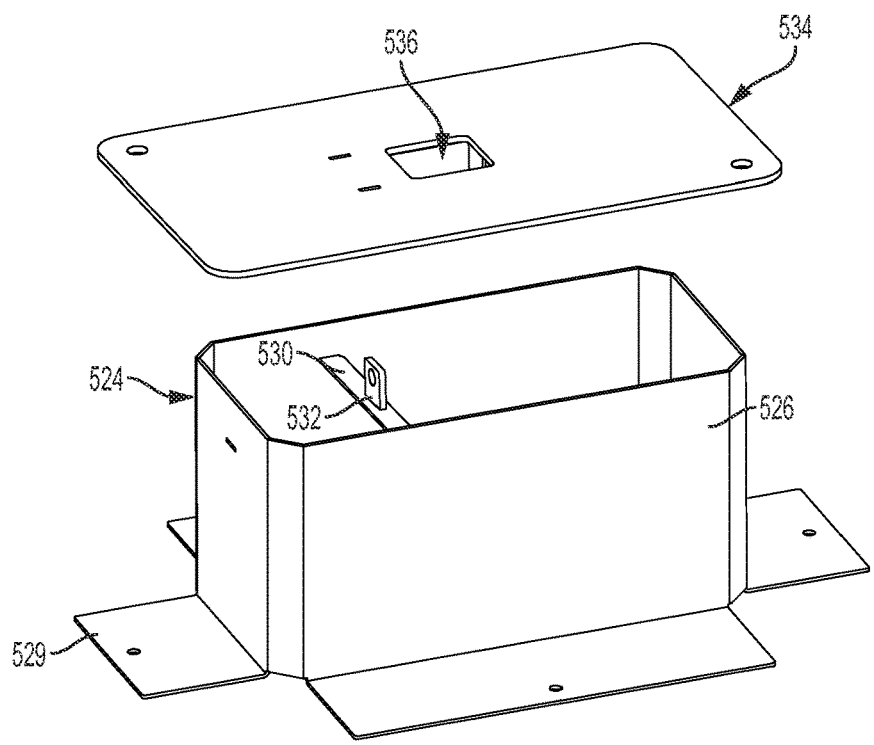
FIG. 23 is a top perspective view of the insert and cover of FIG. 22.
Figure 24:
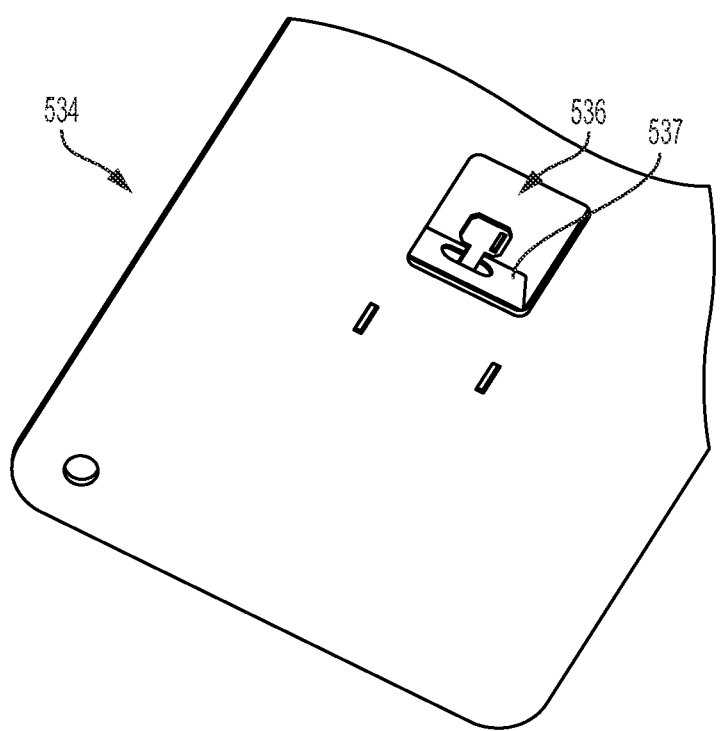
FIG. 24 is a partial perspective view of the cover and a key access chamber of FIG. 23.
Figure 25:
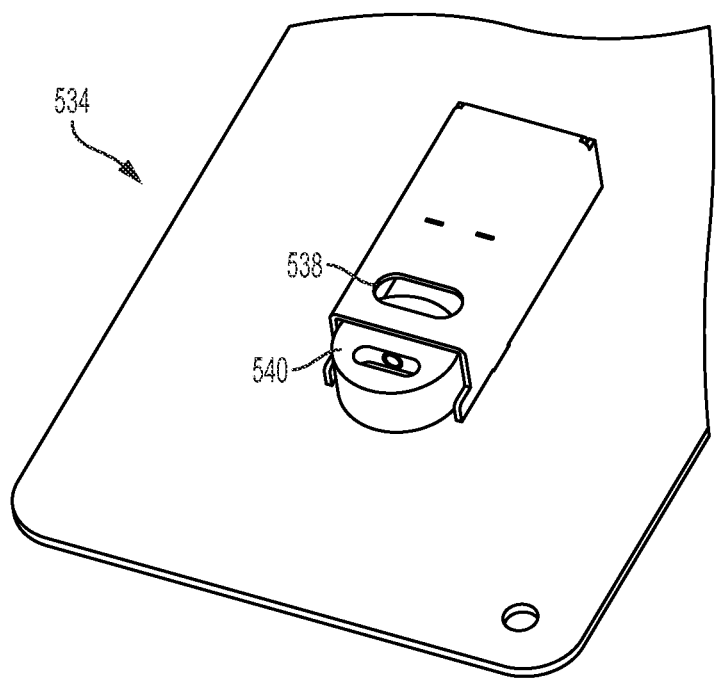
FIG. 25 is a partial perspective view of the cover and a lock chamber of FIG. 23.

FIGS. 22 and 23 depict another exemplary embodiment of a box 510 having a plurality of connected walls 518 surrounding a central opening 52o and a rim 522 extending from the walls 518. An insert 524 is positioned in the central opening 520. The insert 524 may be made of steel or other suitable material. The insert 524 has a plurality of sidewalls 526 surrounding a central region 528. As shown, eight walls are used in an octagonal configuration to maximize the internal volume. In various exemplary embodiments, any number or combination of rectilinear or curvilinear sides may be used, including a single circular or oval side. One or more flanges 529 extend from one or more sidewalls 526 away from the central region 520 and extend at least partially under the sidewalls 518 of the box 510. FIG. 23 shows four flanges 529, although any number of flanges may be used, including a single discrete flange or a single continuous flange.

A cover 534 is connected to the top of the insert 524. The cover 534 and the insert 524 are connected through a locking interface. In an exemplary embodiment, the locking interface includes a first projection 530 that extends across the insert 524 and a leg 532 extending upward from the projection 530. The leg 532 includes an opening to receive the shackle of a lock. The cover 534 includes a top surface and a bottom surface. As best shown in FIG. 22-25, a lock chamber 535 and a key access chamber 536 extend from the bottom surface of the cover 534. The lock chamber 535 and the key access chamber 536 are separated by a partition 537. The lock chamber 535 has an open first end to receive a disc-shaped lock 540. The top of the lock chamber 535 is covered by the bottom surface of the cover 534 to form a hidden aperture, preventing unauthorized access to the lock 540. When the lock 540 is positioned in the lock chamber 535, the key receiving portion of the lock 540 extends through the partition 537 and into the key access chamber 536. The bottom of the lock chamber 535 has a slot 538 that aligns with the path of the disc-lock shackle. When the cover 534 is placed on the insert 524, the leg 532 is received in the slot 538 so that closure of the lock 540 inserts the lock shackle through the opening in the leg 532, securing the cover 534 to the insert 524.

A lid 546 can also be placed over the cover 534. The lid 546 may have one or more openings 548 to receive a fastener 550. The fastener 550 may extend through the lid 546 and into an opening 552 on the rim 522 to secure the lid 546 to the box 510.

Figure 26:
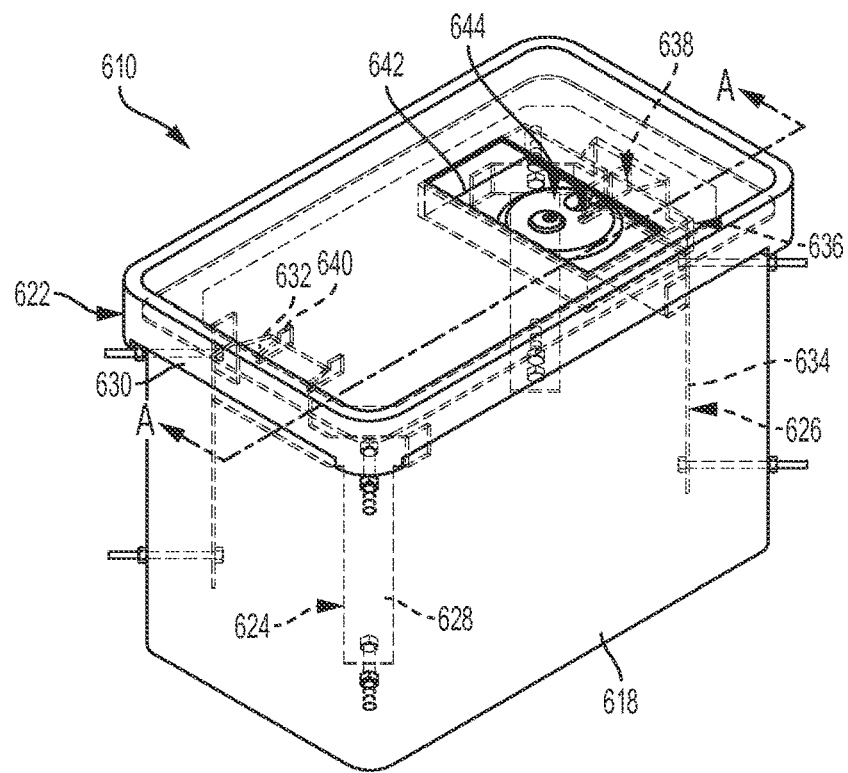
FIG. 26 is a top perspective view of another exemplary box, cover, and bracket.
Figure 27:
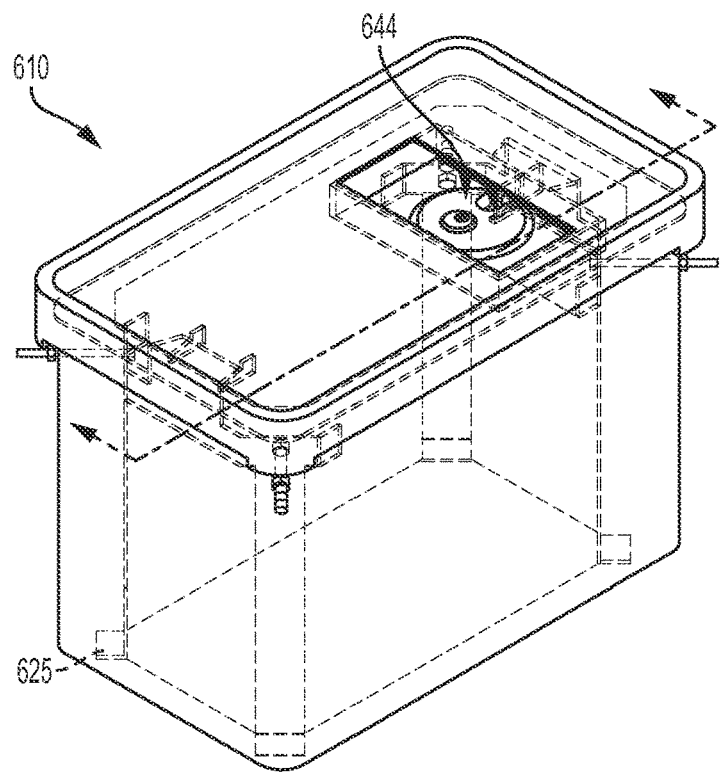
FIG. 27 is a top perspective view of the box and cover of FIG. 26 with another exemplary bracket.
Figure 27A:
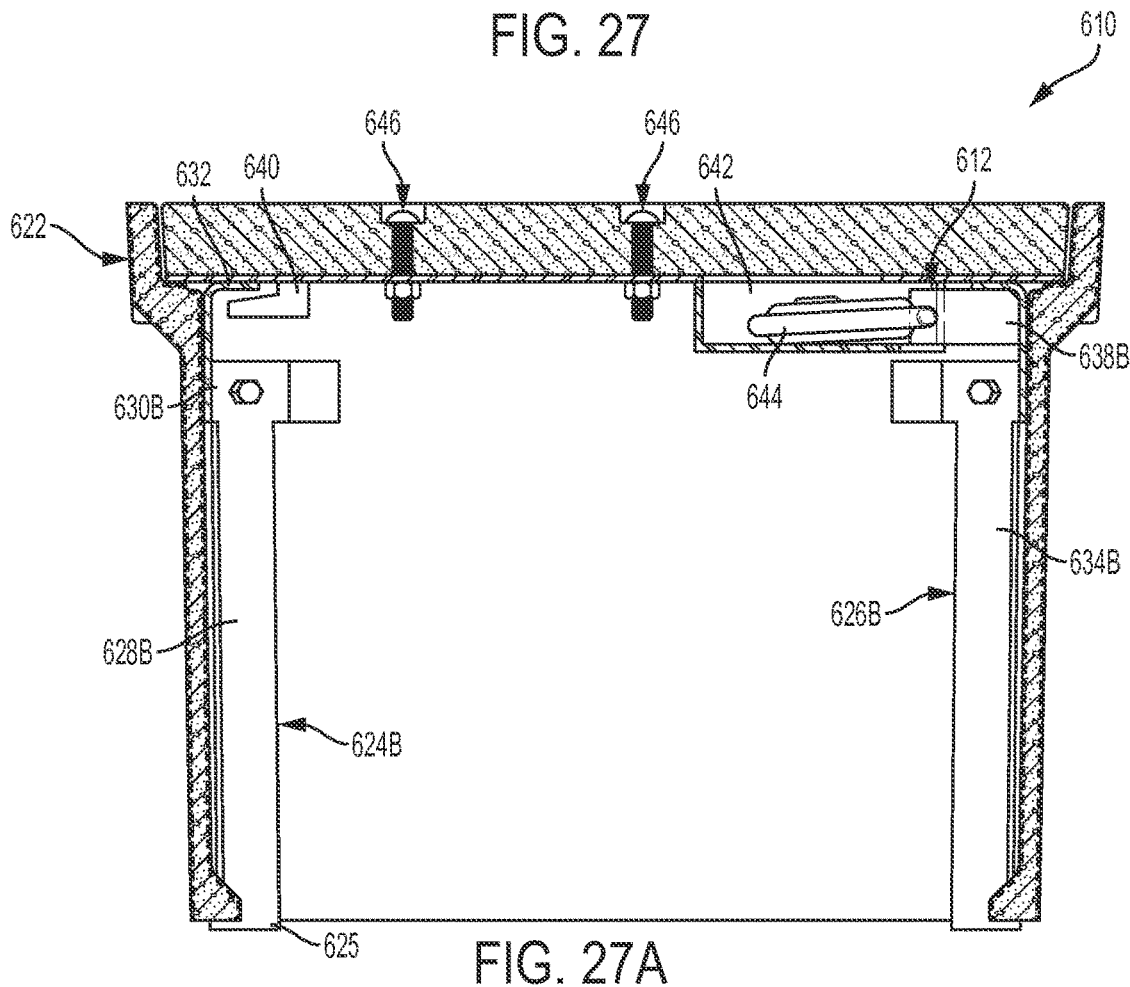
FIG. 27A is a side, sectional view of FIG. 27 with an exemplary lid.

FIGS. 26-27A depict another exemplary embodiment including a box 610, a cover 612, and a lid 614. In an exemplary embodiment, the box 610 includes a concrete polymer material, the cover 612 includes a metal material, and the lid 614 includes a concrete polymer material, although other suitable materials, including polymers, may be used. The box 610 includes a plurality of connected walls 618 surrounding a central opening 620 and a rim 622 extending from the walls 618.

Figure 26A:
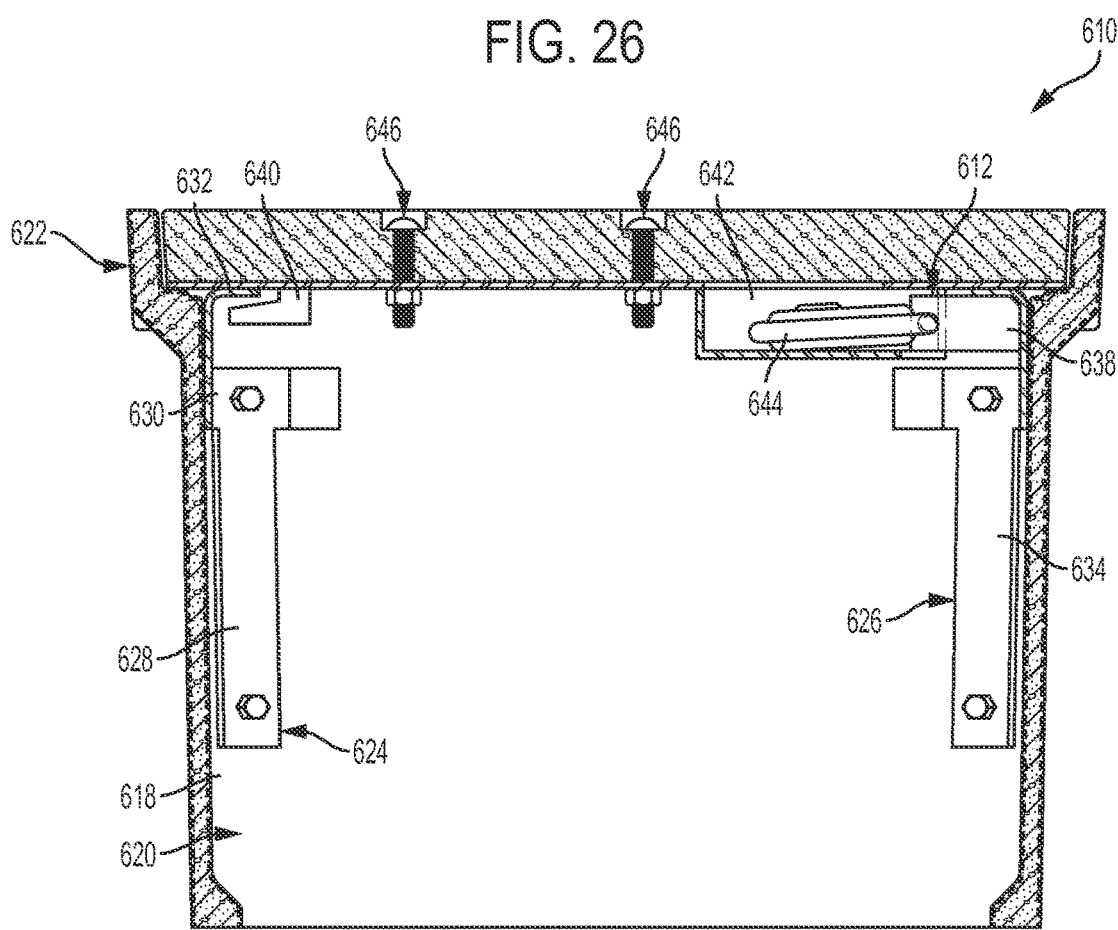
FIG. 26A is a side, sectional view of the FIG. 26 with an exemplary lid.

The box 610 utilizes a first bracket 624 and a second bracket 626 connected to the walls 618 of the box 610. The first and second brackets 624, 626 extend at least partially along the height of the walls 618. FIGS. 26 and 26A depict first and second brackets 624, 626 extending only partially along the walls 18. FIGS. 27 and 27A depict an alternative embodiment where the first and second brackets 624B, 626B extend to the bottom of the walls 618 and include tabs 625 extending underneath the walls 618.

In an exemplary embodiment, the brackets 624, 626 are bolted to the walls 618. The first bracket 624 includes first and second center portions 628, a first member 630 connecting the first and second center portions 628, and a first flange 632 extending from the first member 630. The second bracket 626 includes first and second center portions 634, a second member 636 connecting the first and second center portions 634, and a second flange 638 extending from the second member 636. The second flange 638 includes an opening for receiving the shackle of a lock.

The cover 612 includes one or more tabs 640 and a lock chamber 642 for receiving a lock 644. The tabs 640 extend from the bottom of the cover 612 and the lock chamber 642 extends below the top surface of the cover 612. An opening is provided in the cover 612 to permit access to the lock chamber 642. The cover can be positioned so that the tabs 640 engage or contact the first flange 632 of the first bracket 624 and the second flange 638 of the second bracket 626 extends into the lock chamber 642. The cover 612 can therefore be secured and locked to the box 610. In an exemplary embodiment, lid 614 is fastened to the cover, 612, for example using vandal proof or anti-tamper screws 646.

FIGS. 28-31 depict another exemplary embodiment of an enclosure 700 including a box 710, a lid 712, a cover 714, and one or more brackets 716. The box 710 is positioned in the ground to provide access to a utility line. The area around the box 710 may be filled with concrete to secure the box to the ground. The box 710 has a plurality of connected walls 718 surrounding a central opening 720. In certain embodiments, four or more walls 718 may be used, for example eight walls to give the box an octagonal configuration to maximize the available internal space. In various exemplary embodiments, any number or combination of planar or arcuate sides may be used, including a single circular or oval side.

A rim 721 extends from the top edge of the walls 718. The rim 721 includes a lip 722. In an exemplary embodiment, the rim 721 receives the lid 712 and the plate 714, with the plate 714 resting on the lip 722. In certain installations, the top edge of the rim 721 and the top surface of the lid 712 rest substantially planar with the ground level when the box 710 is installed. In other exemplary embodiments, the top surface of the lid 712 is positioned approximately at or below the top edge of the rim 721, or can rest on top of the rim 721. The walls 718 and rim 721 may be integrally formed from a polymer concrete composite, or other suitable material.

In an exemplary embodiment, the lid 712 includes concrete, a polymer concrete blend, or other suitable material. The lid 712 includes one or more lid openings 724 for receiving first mechanical fasteners 726. The lid opening 724 may include a counter bore to allow the head of the fastener 726 to be positioned beneath the top surface of the lid 712. Various types of fasteners may be used including, but not limited to, a penta-head bolt or a vandal resistant type bolt. The lid 712 may also include one or more pull tabs 728 to facilitate removal of the lid 712 from the box 710.

Figure 29:
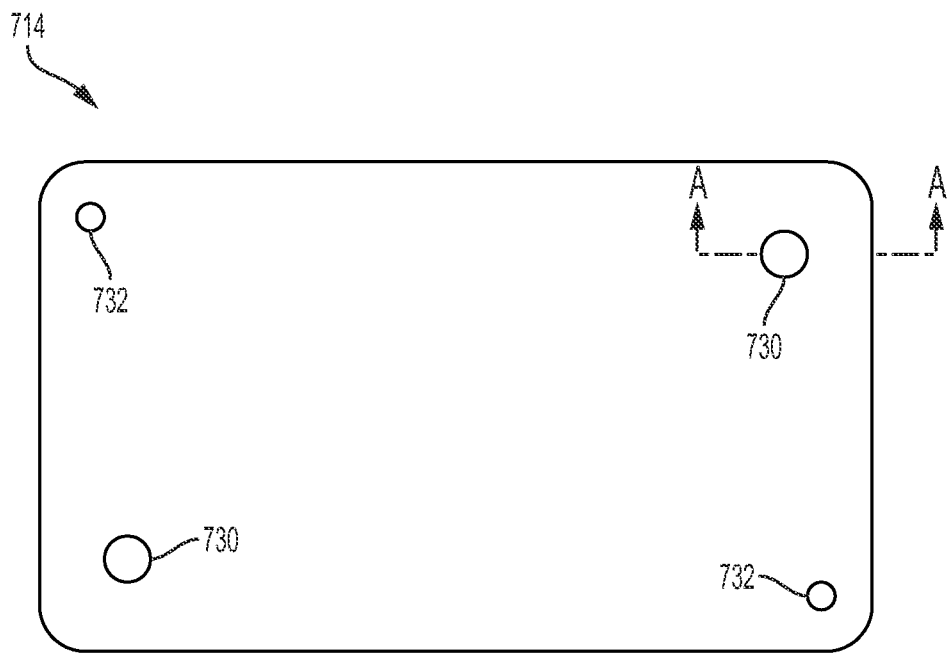
FIG. 29 is a top view of the cover of FIG. 28.
Figure 29A:
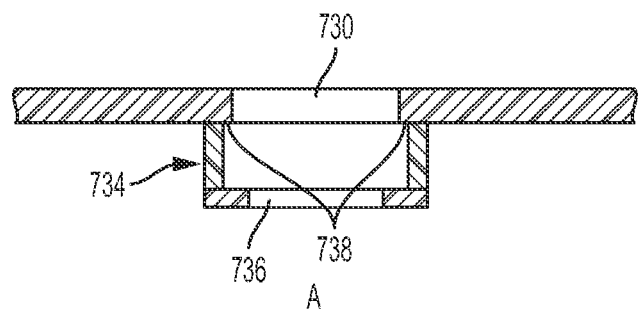
FIG. 29A is a side, sectional view of FIG. 29 along line A-A.

In an exemplary embodiment, the cover 714 includes metal, for example 10 gauge steel, although other suitable metal, polymer, or composite material that adds strength to resist pull out may be used. As best shown in FIGS. 29 and 29A, and in accordance with various exemplary embodiments, the cover 714 includes a first opening 730 and a second opening 732. Although the embodiment shown includes a set of first openings 730 and a set of second openings 732 positioned at opposite corners from one another, the number and placement of openings can be varied.

According to an exemplary embodiment shown in FIG. 29A, first openings 730 include fastener housings 734. The fastener housing 734 includes a first end connected to a plate and a second end having an aperture 736. In an exemplary embodiment the fastener housing 734 has a circular cross section, although configurations using other curvilinear or rectilinear cross sections may be used. The aperture 736 is shown as coaxially with the opening 730, although alternative embodiments may utilize an offset aperture 736. The first end is sized slightly larger than the first opening 730 forming a flange 738 between the edge of the opening 730 and the fastener housing 734. The fastener housing 734 recesses the head of the fastener 740 and, in connection with the flange 738, makes it more difficult for someone to access and remove the fastener 740. The first openings 730 and the fastener housings 734 receive second mechanical fasteners 740. The second openings 732 are aligned with the lid openings 724 and receive the first mechanical fasteners 726 passing through the lid and into the box 710.

As best shown in FIG. 30, and according to an exemplary embodiment, one or more brackets 716 are connected to the inside of the box 710. In an exemplary embodiment, two brackets are used at opposite corners of the box 710. The exemplary bracket 716 has a top leg 742 a bottom leg 744, and a center portion 746 connecting the top and bottom legs 742, 744. The top and bottom legs 742, 744 extend from the center portion 746 in opposite directions at a substantially right angle, although any angle may be used. The top leg 742 extends into the central opening and the bottom leg 744 extends underneath the wall 718. The center portion 746 extends approximately the height of the walls 718, with the top leg 742 extending proximate the top edge of the sidewall 718 and the bottom leg extending underneath of and proximate the bottom edge. In various exemplary embodiments, different sized and spacing orientations may be used for the bracket 716.

The center portion 746 of the bracket 716 includes a pair of holes for receiving a first bolt 748 and a second bolt 750 to connect the bracket 716 to the wall 718. The location of the holes may be varied along the length of the center portion 746. The first and second bolts 748, 750 may also extend through the wall 718 and into the adjacent area, for example the ground or a concrete apron. The second bolt 750 may be longer than the first bolt 748 to provide a more secure connection. In various exemplary embodiments, the length of the bolts 748, 750 may vary.

The top leg 742 has a threaded aperture for receiving the second mechanical fastener 740. The cover 714 is positioned on the lip 722 and the second fastener 740 is passed through the first lid opening 730, into the fastener housing 734, and into the threaded aperture. As the second fastener 740 is rotated, the head of the fastener 740 is seated in the fastener housing 734. The lid 712 is then positioned over the cover 714 and the first fastener 726 is inserted through the lid 712 and the cover 714, and connected to the box 710. As best shown in FIG. 31, the wall 718 includes a connective member, for example a threaded insert 752, receiving the first fastener 726. The threaded insert 752 may be molded into the wall 718 or connected through other suitable methods.

Figure 28:
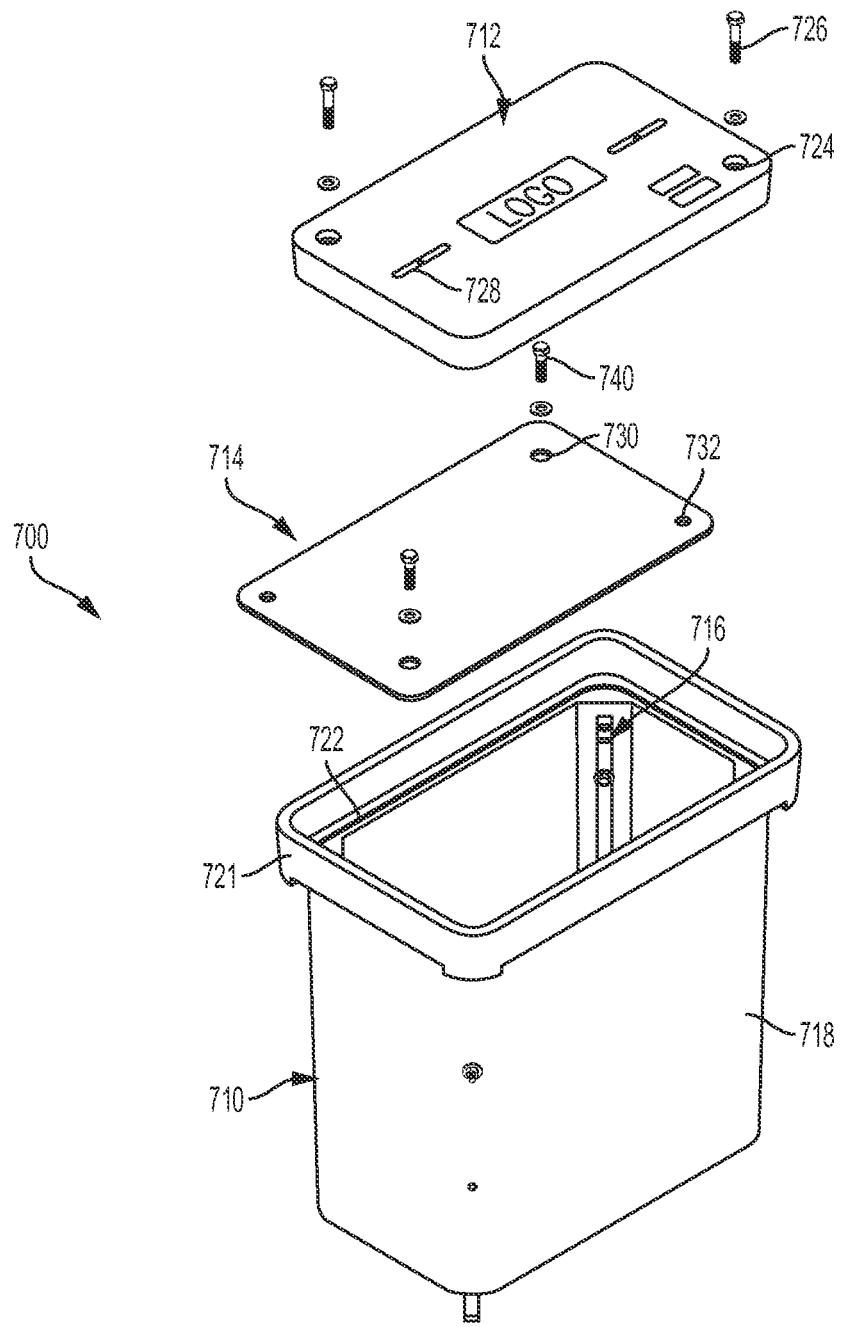
FIG. 28 is a top perspective view of another exemplary box, bracket, lid, and cover.
Figure 32:
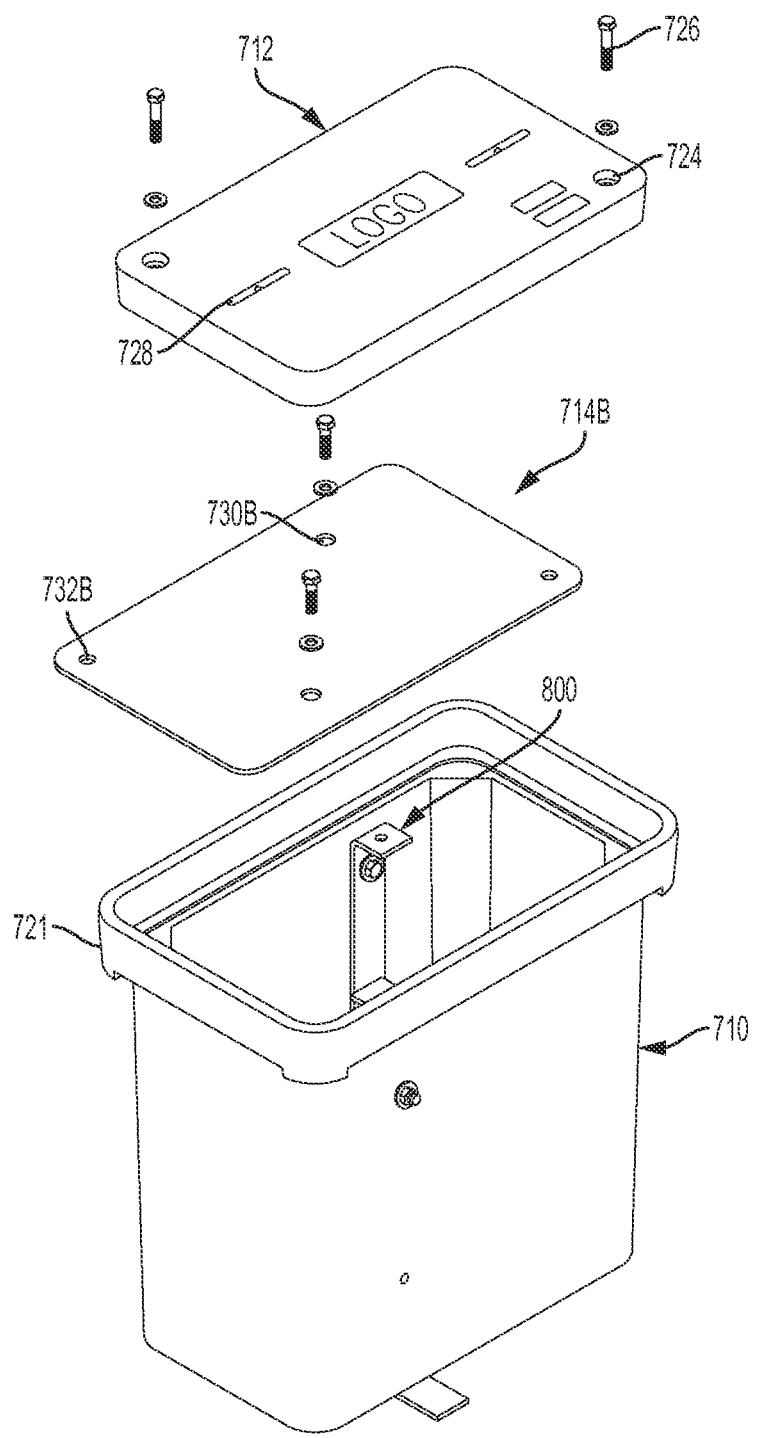
FIG. 32 is a top perspective view of the box and lid of FIG. 28 with another exemplary cover and bracket.
Figure 33:
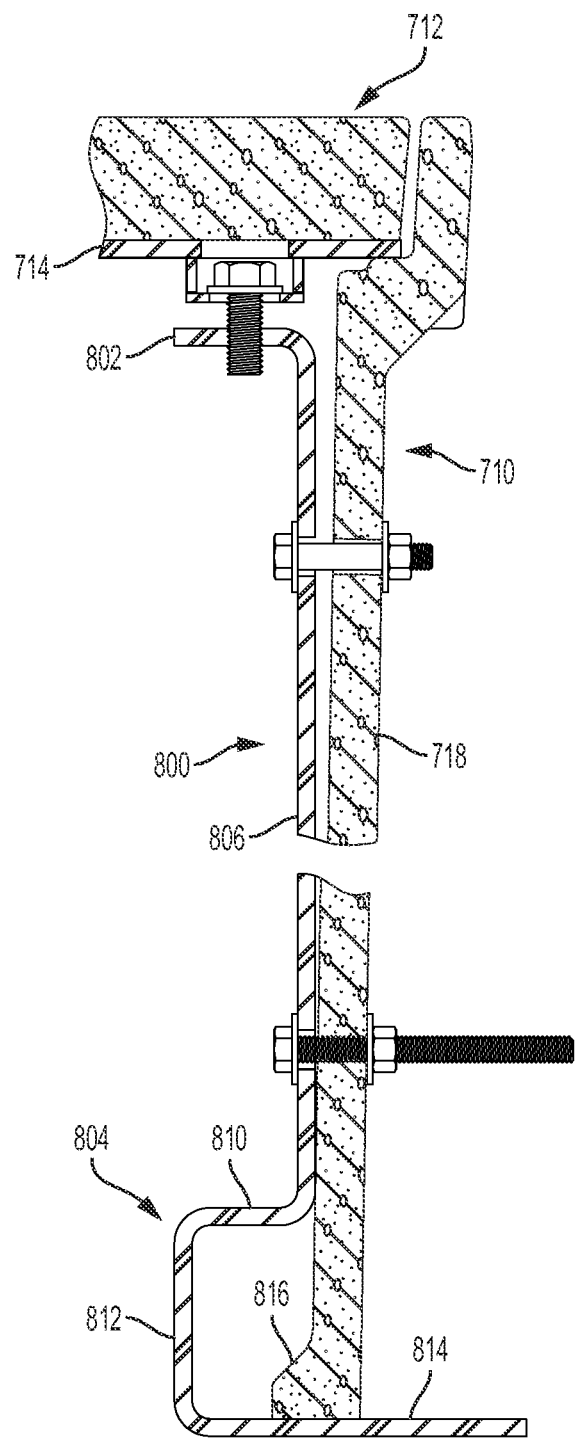
FIG. 33 is a side, sectional view of FIG. 32.
Figure 34:
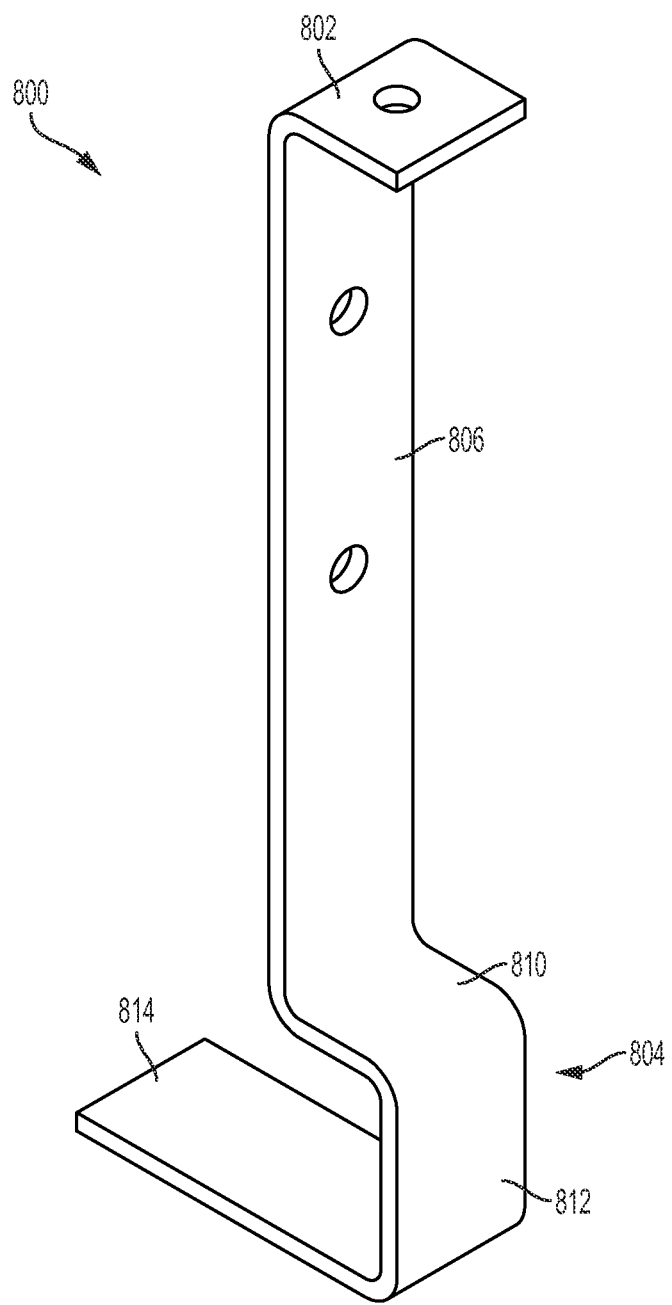
FIG. 34 is a top perspective view of the bracket of FIG. 32.

FIG. 32 shows an exemplary embodiment of an alternative configuration of the box 710 in FIG. 28 utilizing exemplary brackets 800 connected to the inside of the box 710. In an exemplary embodiment, two brackets 800 are connected on opposite walls 718. The brackets 800 are staggered or offset from one another, although different positions and alignments can be used. The exemplary bracket 800 has a top leg 802 a bottom leg 804, and a center portion 806 connecting the top and bottom legs 802, 804.

The top leg 802 extends from the center portion 806 into the central opening of the box 710. The bottom leg 806 includes a first section 810 extending into the box 710, a second section 812 extending downwardly from the first section, and a third section 814 extending from the second section 812 toward the wall 718 of the box 710. The third section 814 is depicted as extending under and past the wall 718. Alternative embodiments, however, can include a third section 814 having different lengths than what is shown, including ones that extend to the edge of the wall 718 or only partially under the wall 718. The bottom leg 804 has a substantially U-shaped configuration providing an open space to receive a protrusion 816 that extends from the wall 718. The first and third sections 810, 814 are at a substantially right angle from the second section 812, although different angles may also be used. The bottom leg 804 can be used with different boxes that have different sized protrusions 816 or no protrusion at all. Other configurations of bracket 800 can also be used.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments

What is claimed:
1. A utility enclosure comprising:
 a box including a plurality of walls and a central opening;
 a bracket having a central portion and a first opening in the central portion;
 a fastener extending through the first opening and connecting the bracket to one of the walls; and
 a removable lid covering the central opening, wherein the bracket includes a cantilevered top leg having a first fixed end and a first free end extending from the central portion into the central opening and a cantilevered bottom leg having a second fixed end and a second free end extending from the central portion underneath a wall, and wherein the top leg extends outwardly from the central portion parallel to the bottom leg, and a first axis extending along the top leg between the first fixed end and the first free end, and a second axis extending along the bottom leg between the second fixed end and the second free end, wherein the first axis is parallel to the second axis.

2. The utility enclosure of claim 1, wherein the bracket includes a second opening in the central portion receiving a second fastener, and a first bolt extends through the first opening and a second bolt extends through the second opening.

3. The utility enclosure of claim 2, wherein the first and second bolts extend through and past the wall.

4. The utility enclosure of claim 1, wherein the top leg includes a threaded aperture.

5. The utility enclosure of claim 1, wherein the lid includes a reinforcement.

6. The utility enclosure of claim 5, wherein the reinforcement includes a fiberglass mat.

7. The utility enclosure of claim 5, wherein the reinforcement is molded into the lid.

8. The utility enclosure of claim 5, wherein the reinforcement includes a metal plate.

9. The utility enclosure of claim 1, wherein a cover is positioned between the lid and the box.

10. The utility enclosure of claim 9, wherein a first fastener extends through the cover and connects to the bracket and a second fastener extends through the lid, the cover, and connects to the box.

11. The utility enclosure of claim 9, wherein the cover includes a fastener housing.

12. A utility enclosure comprising:
a box including a wall, a rim extending from the wall, and a first aperture;
a bracket connected to the wall including a top leg having a second aperture;
a cover having a first cover opening and a second cover opening;
a lid having a first lid opening;
a first fastener passing through the first lid opening, the second cover opening, and connected to the first aperture; and
a second fastener passing through the first cover opening and connected to the second aperture, wherein the second fastener is inaccessible to a user when the lid is connected is connected to the box over the cover,
wherein the cover includes a fastener housing for receiving the second fastener, the fastener housing extending from the bottom of the cover and having a top aperture and a bottom aperture coaxially aligned with the first cover opening, the top aperture positioned adjacent to the first cover opening and having a larger diameter than the first cover opening, and the bottom aperture having a smaller diameter than the top aperture, and
a flange disposed between the top aperture and the first cover opening and configured to limit translational movement of the second fastener.

13. The utility enclosure of claim 12, wherein the bracket includes a bottom leg extending underneath of the wall and a center portion connecting the top leg and the bottom leg.

14. A utility enclosure comprising:
a box including a wall, a rim extending from the wall, and a first aperture;
a bracket connected to the wall including a top leg having a second aperture;
a cover having a first cover opening and a second cover opening;
a lid having a first lid opening;
a first fastener passing through the first lid opening, the second cover opening, and connected to the first aperture; and
a second fastener passing through the first cover opening and connected to the second aperture,
wherein the cover includes a fastener housing for receiving the second fastener, the fastener housing extending from the bottom of the cover and wherein the second fastener passes through the fastener housing to connect to the second aperture, and
wherein a flange is disposed between the first cover opening and the fastener housing such that an inner wall of the fastener housing is radially outside of the first cover opening, the flange configured to limit translational movement of the second fastener.

15. The utility enclosure of claim 14, wherein the fastener housing extends from a bottom surface of the cover.

* * * * *